Aug. 16, 1927.
R. P. BROWN
1,639,365
COMPENSATING MEANS FOR TEMPERATURE MEASURING INSTRUMENTS
Filed Nov. 1, 1921  2 Sheets-Sheet 1
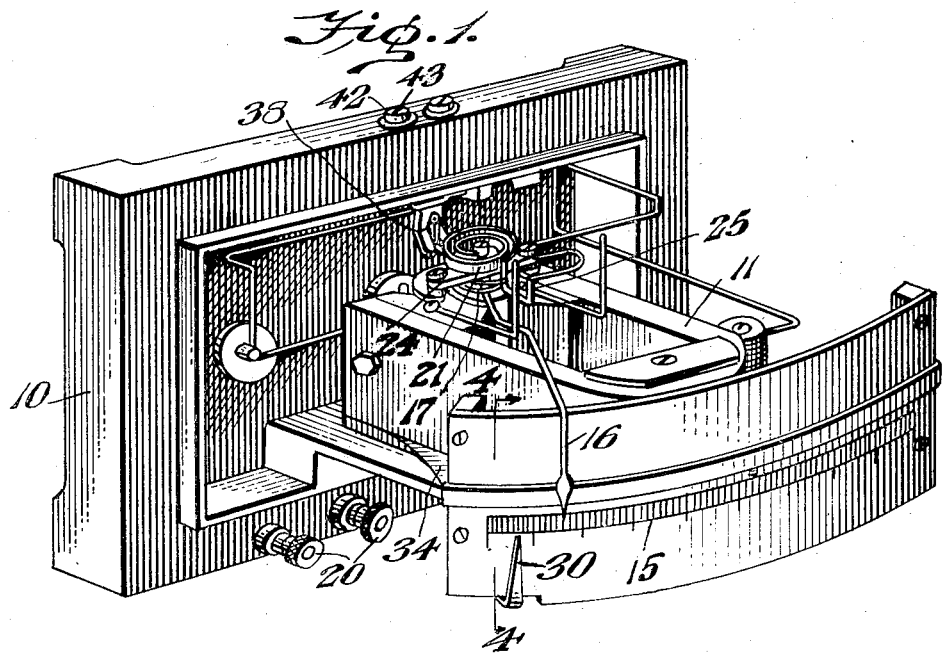
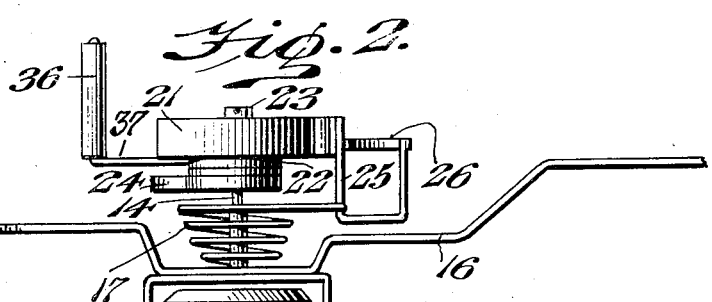
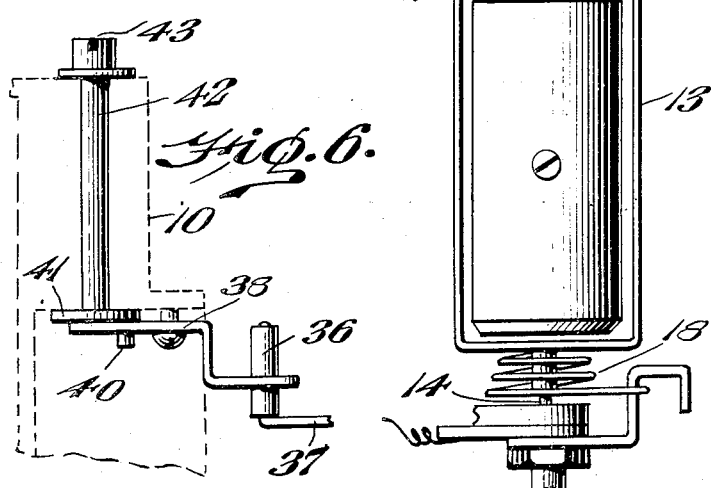
INVENTOR
Richard P. Brown.
BY
Robert M. Barr.
ATTORNEY Aug. 16, 1927.
R. P. BROWN
1,639,365
COMPENSATING MEANS FOR TEMPERATURE MEASURING INSTRUMENTS
Filed Nov. 1, 1921      2 Sheets-Sheet 2
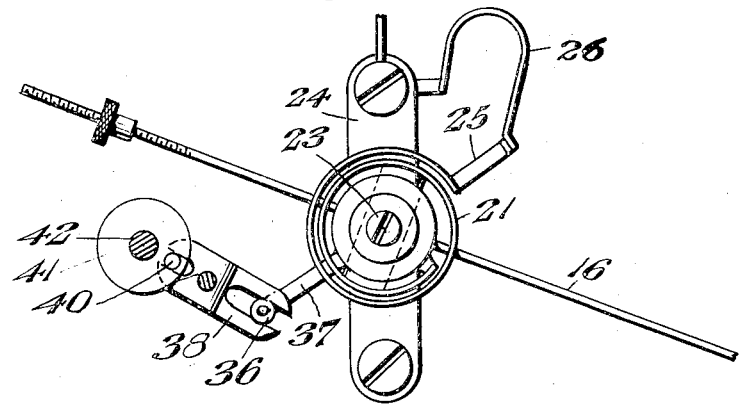
Fig. 3.
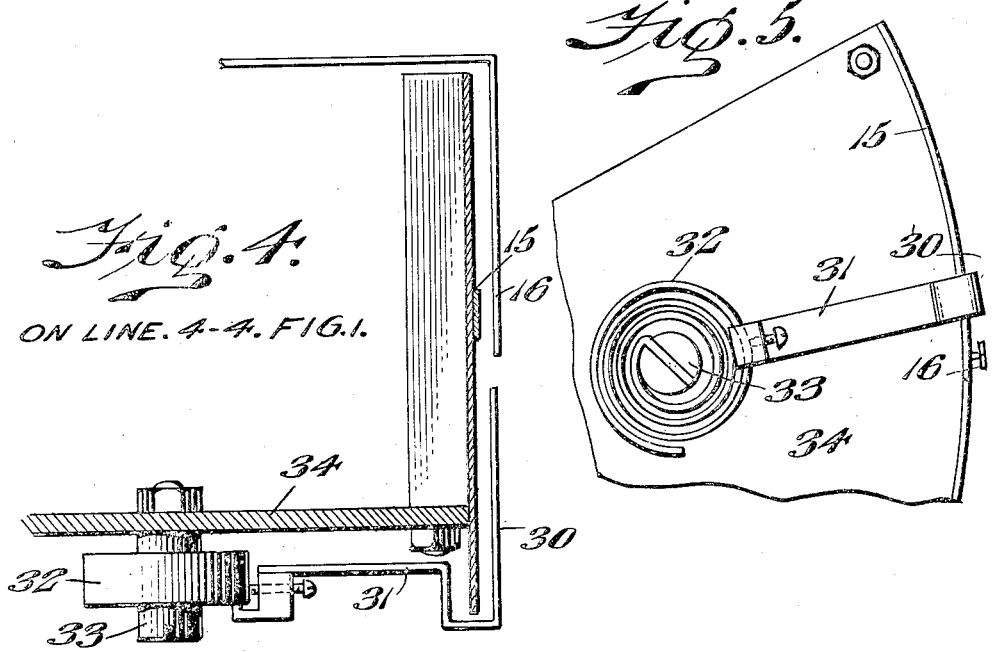
Fig. 4.
ON LINE. 4-4. FIG. 1.
Fig. 5.
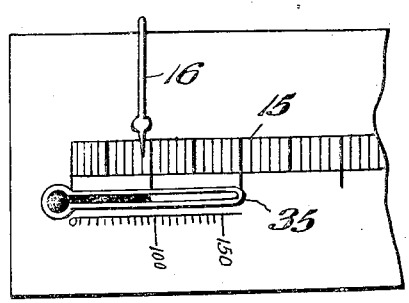
Fig. 7.
INVENTOR
Richard P. Brown.
BY
Robert M. Barr
ATTORNEY Patented Aug. 16, 1927.

1,639,365

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

COMPENSATING MEANS FOR TEMPERATURE-MEASURING INSTRUMENTS.

Application filed November 1, 1921. Serial No. 512,018.

Some of the objects of the present invention are to provide means for automatically compensating a temperature measuring instrument for changes in temperature surrounding the instrument; to provide means for compensating the indicating means of a pyrometer for variations in the cold junction temperature of a thermo-couple used therewith, to provide means for indicating the calibrated condition of a pyrometer whereby the user is informed as to whether or not the pointer is set to the correct cold junction temperature; to provide means for setting the pointer of a pyrometer to zero to give accurate true readings for the hot junction temperature of a thermo-couple connected to such instrument; and to provide other improvements as will hereinafter appear.

In the accompanying drawings, Fig. 1 represents a perspective of a pyrometer embodying one form of the present invention for compensating for changes in the cold junction temperature; Fig. 2 represents a detail in elevation of the movable element including certain cold junction temperature compensating means; Fig. 3 represents a plan of the parts shown in Fig. 2; Fig. 4 represents a section on line 4—4 of Fig. 1, showing one form of zero compensating means for cold junction temperature; Fig. 5 represents a bottom plan of the parts shown in Fig. 4; Fig. 6 represents an elevation of the instrument scale provided with another form of zero compensating means; and Fig. 7 represents a detail in elevation of the pointer setting means.

Referring to the drawings one form of the present invention is shown upon a pyrometer of standard construction comprising a base 10 arranged to support a magnet 11 having a current sensitive movable element 13 delicately mounted upon jewelled bearings 14 for oscillating movement between the magnet poles. A temperature scale 15 is fixedly supported in a position to be readily visible for taking readings, and a pointer 16 is arranged in operative relation to the scale 15 for the usual purpose. This pointer 16 is made fast to the movable element 13 for co-axial oscillation, while coiled hair springs 17 and 18 operate to control the return movements of the movable element 13 and the pointer 16, so that the latter on open circuit will indicate on the scale 15, the cold junction temperature of the thermo-couple with which the instrument is used, or the temperature surrounding the instrument. In the present construction extension or compensating leads transfer the cold junction of the thermo-couple to the interior of the enclosing casing of the instrument by way of the binding posts 20. It will be understood where extension leads are not used that the thermo-couple may be directly connected to these posts 20 and the same results obtained.

For the purpose of compensating the instrument in accordance with the cold junction temperature, or the temperature surrounding the instrument, a spiral 21 of the Briguet type, formed of two differently expanding metals, is mounted in coaxial relation with the movable element 13, one end of said spiral being fixed to a disc 22 which is rotatably carried by a threaded staff 23. This staff 23 extends through a transverse rigid bar 24 to serve as an adjustable holder for the upper bearing 14. The connection of the disc 22 to the staff 23 is such that there is no relative movement between these two parts under normal operation, and movement only takes place by adjustment as will be presently explained. The other or free end of the spiral 21 is soldered or otherwise made fast to the free end of the coil spring 17, Fig. 2, the connection, in this instance, consisting of a conducting strip 25 electrically bonded to both the end of the spiral 21 and the spring end 17, and also to an end of a conducting wire 26 which is in one branch of the instrument control circuit and of loop form for self adjustment under movement of the parts. The spiral 21 is thus arranged to directly control the movable element 13 and the pointer 16, and being composed of thermostatic metal a change of temperature will cause the spiral to either expand or contract depending, of course, upon a rise or fall in the temperature surrounding the said spiral. In the present case it is a change in temperature of the cold junction of the thermo-couple connected to the instrument which causes the spiral to operate, and as a result the pointer 16, with no current in the instrument, is maintained normally pointing to a degree mark on the scale 15 which indicates the correct cold junction temperature.

As a means for determining whether or not the pointer 16 is set to correctly indicate the cold junction temperature, an auxiliary pointer 30 is located adjacent the low end of the scale 15 and forms the end portion of an arm 31 which is adjustably clamped upon the outer convolution of a Briguet spiral 32. This spiral 32 is made of thermostatic metal, that is, of two metals having different coefficients of expansion, and has its inner convolution fixed to a post 33, Fig. 4, or other device fastened to the scale supporting frame 34. Thus the spiral 32 is located within the instrument case and is therefore exposed to the same temperature as the spiral 21, which is the cold junction temperature of the thermo-couple, and consequently maintains the auxiliary pointer 30 always indicating the correct cold junction temperature. Therefore, with the instrument properly adjusted and calibrated, the two pointers 16 and 30 will be in accurate alinement, both pointing to the same degree mark on the scale 15 when no current is flowing through the instrument. The auxiliary adjusting means therefore becomes a highly essential part of the instrument, because in its absence there is no way to ascertain whether the pointer 16 is indicating the true hot junction temperature under closed circuit conditions. For example, the pointer 16 might stand on the scale 15 at 110° F. with the circuit open, and the question arises, is the pointer 16 standing at this position on the scale because the temperature surrounding the instrument is 110°, or is the temperature surrounding the instrument only 90° F. and the initial indication has shifted 20° due to the instrument shifting its so-called zero reading. With the auxiliary pointer 30 such a question cannot arise because any disalinement of the pointer 16 with the pointer 30 indicates a resetting of the former is necessary to give a true reading.

As another means for determining whether or not the pointer 16 is correctly set to the cold junction temperature, a thermometer 35 may be employed, Fig. 7, the same being mounted lengthwise of the scale 15 so that the temperature responsive fluid accurately registers with the graduations of the scale 15, say from 0° to 150°. Thus any variation of the pointer 16 from the cold junction temperature as indicated by the thermometer is instantly observable and the pointer 16 can be readjusted for true readings.

For resetting the pointer 16, one means consists of a finger 36 carried by an arm 37 which is rigidly secured to the disc 22 on the staff 23, Figs. 2, 3 and 6. The finger 36 projects between the bifurcated end of a pivoted lever 38, the other end of which is engaged by a crank pin 40 fixed to a disc 41 fast to the inner end of a rod 42 which passes through a portion of the base 10 and terminates in a projecting end having a slot 43 by which it can be turned by a suitable tool. Any turning movement of the disc 41 is communicated to the lever 38 which then rocks on its pivot and transmits the motion to the disc 22. The disc 22 is thus turned to change the position of the spiral 21 and consequently the pointer 16 is swung to the desired zero position.

From the foregoing it will be evident that a complete unitary self-compensating means has been provided whereby pyrometers are rendered accurate and true for readings of the hot junction temperature, irrespective of variations in the temperature of the cold junction, such variations being immediately corrected by the automatic shifting of the pointers of the instrument. Thus, when the pyrometer circuit is open, both thermostatic devices are subject to the cold junction temperature and the pointers 16 and 30 should register the same initial indication. In case the pointer 16 is out of register it is evident the pointer control mechanism is out of adjustment and the resetting means 42 is adjusted to reset the pointer to the point indicated by the fixed pointer 30, whereupon the pointer 16, under closed circuit conditions, will indicate upon the scale 15 the true hot junction temperature of the connected thermo-couple.

Although only two forms in which this invention may be embodied have been shown herein, it is to be understood that the invention is not limited in its application to any specific construction but might be applied in various systems without departing from the spirit of the invention or the scope of the appended claims.

Having thus described my invention, I claim:

1. In a pyrometer, the combination of a scale, a pointer arranged to cooperate with said scale for indicating purposes, means responsive to the cold junction temperature of a thermo-couple for setting said pointer on said scale to an indication determined by said cold junction temperature, means also responsive to said cold junction temperature for locating on said scale the indication corresponding to said cold junction temperature, and means responsive to the hot junction temperature of said thermo-couple for causing said pointer to indicate said hot junction temperature.

2. In a pyrometer, the combination of a scale, a pointer arranged to cooperate with said scale for indicating purposes, means operative on open pyrometer circuit for causing said pointer to indicate on said scale the indication corresponding to the cold junction temperature of a thermo-couple, means operative on a closed pyrometer circuit for causing said pointer to indicate the temperature of the hot junction of said thermo-couple, and temperature compensating means arranged to constantly indicate the indication on said scale corresponding to the cold junction temperature.

3. In a thermo-electric pyrometer for use with a thermo-couple having its cold junction extended into the same temperature zone as the meter, a meter of the deflecting galvanometer type having a pointer and scale and a bimetallic thermo-sensitive element arranged to compensate the galvanometric indications of the pointer to correct for fluctuations of cold junction temperature of the thermo-couple, a second bimetallic thermo-sensitive element and a pointer attached to the last mentioned element and forming with the latter and said scale a thermometer adapted to measure the temperature of the temperature zone of the meter.

4. In an electrical measuring instrument, the combination with a supporting structure, of a scale carried by said structure, a movable element rotatably mounted in said structure and comprising a coil and a pointer moving along said scale when said element is rotated, a connection between said element and structure fixing the position of the pointer along said scale when said coil is deenergized and including a thermostat for making said position dependent on the temperature at the instrument, said connection being adjustable to vary said position, and a second thermostat connected to said structure and provided with a pointer moving along said scale in response to variations in said temperature and adapted to thereby indicate the position along said scale at which the first mentioned pointer should stand when said coil is deenergized.

5. In an electrical measuring instrument, the combination with a supporting structure, of a scale carried by said structure, a movable element rotatably mounted in said structure and comprising a coil and a pointer moving along said scale when said element is rotated, a connection between said element and structure fixing the position of the pointer along said scale when said coil is deenergized and including a thermostat for making said position dependent on the temperature of the instrument, said connection being adjustable to vary said position, a second thermostat, means adjustable connecting the later to said structure, and a pointer connected to said thermostat and moved by the latter along said scale in response to variations in said temperature and adapted to thereby indicate the position along said scale at which the first mentioned pointer should stand when said coil is deenergized.

6. In an electrical measuring instrument the combination with a supporting structure, of a scale carried by said structure, a movable element rotatably mounted in said structure and comprising a coil and a pointer moving along said scale when said element is rotated, a connection between said element and said structure including a thermostat and a spring, the latter yielding to permit rotation of the element when said coil is energized and said thermostat tending to rotate said element in response to changes in the temperature to which the instrument is subjected so that the position of said pointer along said scale varies with said temperature when said coil is deenergized, and a separate thermostat connected to said structure and provided with a pointer moving along said scale in response to variations in said temperature and adapted to thereby indicate the position along said scale at which the first mentioned pointer should stand when said coil is deenergized, said connection being adjustable to vary the position along said scale assumed by the first mentioned pointer when said coil is deenergized.

Signed at Philadelphia, in the county of Philadelphia, and State of Pennsylvania, this 24 day of October, 1921.

RICHARD P. BROWN.